United States Patent [19]

Stohrer

[11] 4,249,804
[45] Feb. 10, 1981

[54] SPRING HINGE FOR SPECTACLES

[76] Inventor: Kurt Stohrer, Lerchenweg 18, 7030 Boblingen, Fed. Rep. of Germany

[21] Appl. No.: 46,707

[22] Filed: Jun. 8, 1979

[30] Foreign Application Priority Data

Jun. 12, 1978 [DE] Fed. Rep. of Germany ....... 2825711

[51] Int. Cl.³ ............................................... G02C 5/14
[52] U.S. Cl. .......................................... 351/121; 2/426
[58] Field of Search ............. D16/353; 351/121, 120, 351/113, 100, 99, 153, 118, 89, 103; 2/13, 426; 16/128, 287, 140

[56] References Cited

U.S. PATENT DOCUMENTS

| 1,687,954 | 10/1928 | Stevens | 351/121 |
| 3,572,914 | 3/1971 | Piola | 351/113 |
| 3,713,731 | 1/1973 | Gardner | 351/121 |
| 4,076,394 | 2/1978 | Nakamura | 351/121 |
| 4,178,081 | 12/1979 | Metcalfe | 351/121 |

FOREIGN PATENT DOCUMENTS 349425 11/1960 Switzerland ............................ 351/113

OTHER PUBLICATIONS

Wilkin, Acanthoma Fissuratum Cutis, J. Dermatol. Surg. Oncol., 3:5, Sep./Oct. 1977, pp. 531,532.
Carcenomatose van de Herseuvliezen, Hengefeld et al., p. 1875, Ned T. Geneesk 122, nr. 48, 1978.
Oorspronkelijke Stukken, same as above 1873.
Contact Dermatitis to Butyl Acrylate in Spectacle Frames.

Primary Examiner—John K. Corbin
Assistant Examiner—B. Wm. de los Reyes

[57] ABSTRACT

Spectacles have a stay bar pointing rearwardly from the edge of the frame and an extension spectacle arm. A hinge connects the spectacle arm and the stay bar on the inside, so that the front faces of the stay bar and the spectacle arm are spaced apart in the open position of the spectacle arm. A leaf spring extends on both sides of the front faces, spaced from the hinge swivel. It is rigidly connected to one outer surface of the spectacle arm or stay bar at one end region. The other end region of the leaf spring is adapted to touch the other outer surface of the spectacle arm or stay bar in the swivel position of the spectacle arm corresponding to its desired open or stop position.

3 Claims, 2 Drawing Figures

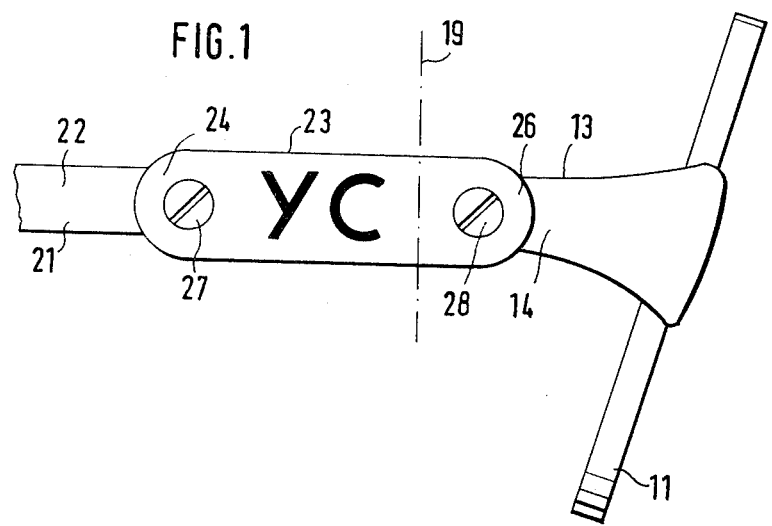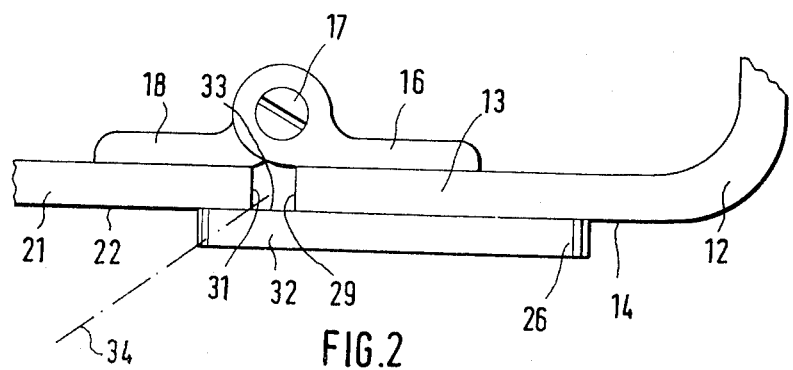

SPRING HINGE FOR SPECTACLES

The invention relates to a spring hinge for spectacles, with a stay bar which points rearwardly from the edge of the frame and has an outer surface, with a spectacle arm in extension of the stay bar, which likewise has an outer surface, with a hinge which connects the spectacle arm and the stay bar and is provided on the inside of the stay bar and the spectacle arm, and which has a swivel axis, and also with a rearwardly pointing front face on the stay bar and with a front face on the spectacle arm pointing forwards in the open state of the arm.

BACKGROUND OF THE INVENTION

The arm stop itself is defined by the striking of the two front faces against each other. Nevertheless, spring hinges have been widely used, because they protect the parts which produce the swivelling movement from overloading when the spectacles are opened too far. A confortable seating of the spectacles also results when the spectacles have to be moved beyond the normal angle of the arm; if, for example, the spectacles are placed on the forehead instead of the nose, or the spectacles are played with, etc.

The spring hinges known up to now are expensive, are composed of several parts, can be provided only on the inside of the stay bar/spectacle arm section, are too cumbersome to be able to be used in elegant metal spectacles, are conspicuous, require the use of special hinges and require the springs to have certain shapes and certain settings, which result in very variable specific stress.

OBJECTS AND STATEMENT OF THE INVENTION

The objects of the invention are to provide a spring hinge which is inexpensive, can also be used with high-grade spectacles, is suitable for everyday use, can also be used with narrow metal spectacles, also permits the use of normal hinges, can be used outside and gives the designer the necessary design freedom and also permits the optician to adjust the arm stop angle by simple means.

According to the invention, these objects are achieved by the following features in a spring hinge of the type hereinbefore mentioned:

(a) The front faces are spaced from each other in the open or stop position of the bow.
(b) A leaf spring is provided which is spaced from the swivel axis of the hinge, extends on both sides of the front faces, and in one of its end regions has a fastening area by which it is connected to one of the outer surfaces.
(c) The other end region is adapted to touch the other outer surface in the swivel position of the spectacle arm corresponding to the desired open or stop position.
(d) This other outer surface is composed of metal.

Such a leaf spring can be a completely flat and therefore easily stampable spring; which, for example, is composed of a hardenable non-ferrous metal/spring alloy, such as a copperberyllium alloy. Such a leaf spring is merely stressed to bending point and for this reason its mode of behaviour can easily be supervised. The optician can determine the arm angle by bending the leaf spring with a small pair of pliers. He therefore no longer needs to do any filing. The leaf spring in an aesthetically pleasing way covers the gap between the two front faces which is often difficult to avoid. The leaf spring can also be used to fulfill decorative functions when letters or ornamentation are provided on its outer surface. The leaf spring then has the dual function of a spring hinge and also of decoration in the area of the hinge, which can frequently be encountered.

DESCRIPTION OF THE DRAWING

The invention is now explained by reference to two preferred exemplified embodiments, taken together with the drawing, in which:

FIG. 1 shows a side view of the hinge area of a first embodiment,

FIG. 2 shows a top plan view of the hinge area of a second exemplified embodiment.

DETAILED DESCRIPTION OF THE INVENTION

A pair of spectacles has a frame edge 11, from which a metallic stay bar 12 extends. Its limb 13 points rearwardly and has a flat outer surface 14. Onto its inside the first half 16 of a hinge is soldered, whose screw 17, together with the second half 18 of the hinge, defines a swivel axis 19.

In extension of the limb 13 there extends a spectacle bow 21, which has an outer surface 22.

A leaf spring 23 is slightly higher than the spectacle bow 21 and the limb 13, so that it covers the latter. In its end regions 24 and 26, two metal screws 27 and 28 are provided. The leaf spring 23 is approximately 0.5 mm thick and about 2 cm long. The metal screw 27 is screwed into the spectacle arm 21, while the shaft of the metal screw 28 merely passes through the leaf spring 23 but does not project. Thus, here it is a matter of a blind screw simply acting as decoration. From the viewpoint of the swivel axis 19, the end region 26 is closer to it than the end region 24. The leaf spring 23 is flat.

In the exemplified embodiment as per FIG. 2, one can see the rearwardly pointing front face 29, opposite which lies the forwardly pointing front face 31 of the spectacle arm 21. The leaf spring 32 used in this exemplified embodiment is only as narrow as the limb 13 and only as high as the spectacle arm. This leaf spring 32 carries no decoration on the outside. In contrast to the first exemplified embodiment, the right hand end region 26 is soldered onto the outside surface 14 of the limb 13. Desired positioning of the arm angle is obtained when the inside surface 33 of the leaf spring 32 touches the outer surface 22.

As in all the exemplified embodiments the front faces 29 and 31 have a definite spacing from each other, the spectacle arm 21 can be moved further outwardly, as the dot-dash line 34 shows. Only then do the front faces 20 and 31 touch, and the leaf spring 23 or 32 can no longer be further bent outwardly.

What I claim is:

1. A spring hinge for spectacles, having lense frames, a stay bar which points rearwardly from the edge of the frame and has an outer surface; a spectacle arm in extension of the stay bar, which likewise has an outer surface; a hinge provided on the inside of the stay bar and the spectacle arm which connects the spectacle arm and the stay bar and which has a swivel axis; a rearwardly pointing front face on the stay bar and a front face on the spectacle bow pointing forwards in the open position of the spectacle arm; comprising the following improvements:

(a) the front faces are spaced apart from one another in the open position of the spectacle arm;
(b) a leaf spring is provided which is spaced from the swivel axis of the hinge and extends on both sides of the front faces and has a fastening area in one of its end regions, by which it is rigidly connected to one of the outer surfaces;
(c) at the other end region the inside surface of the leaf spring is adapted to touch the other outer surface in the swivel position of the spectacle arm corresponding to the desired open position; and
(d) this other outer surface is composed of metal.

2. A spring hinge as claimed in claim 1, in which the unfastened end region of the leaf spring lies considerably closer to the nearest end region of the stay bar or the spectacle arm than the fastened end region of the leaf spring lies to the end region which is next to it.

3. A spring hinge as claimed in claim 1, wherein the front faces are adapted to touch each other in a swivel position of the spectacle arm corresponding to a desired maximum position.

* * * * *